No. 60,521.                                            PATENTED DEC. 18, 1866.
I. A. ISAACS.
FOOT BATH.

United States Patent Office.

IMPROVEMENT IN FOOT-BATHS.

ISAAC A. ISAACS, OF CLEVELAND, OHIO.

Letters Patent No. 60,521, dated December 18, 1866.

---

The Schedule referred to in these Letters Patent and making part of the same.

---

TO ALL WHOM IT MAY CONCERN:

Be it known that I, ISAAC A. ISAACS, of Cleveland, in the county of Cuyahoga, and State of Ohio, have invented certain new and useful improvements in Pails for the Foot-Bath; and I do hereby declare that the following is a full and complete description thereof, reference being had to the accompanying drawings, making a part of this specification in which—

Like letters refer to like parts in the different views.

Figure 1:
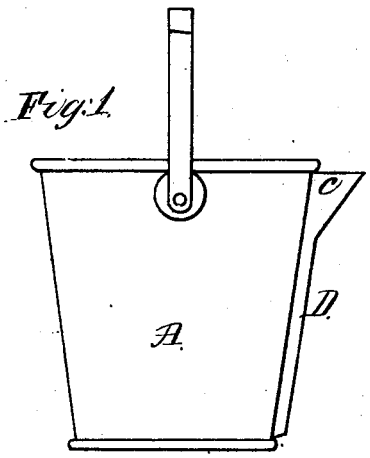
Figure 1 is a side view of the pail.
Figure 2:
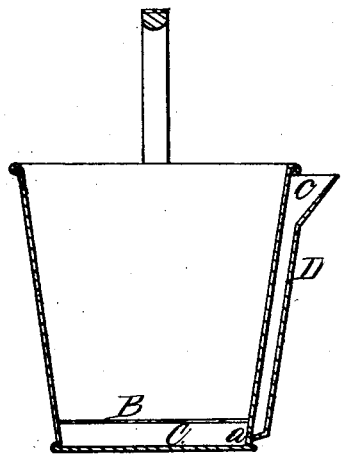
Figure 2 is a transverse section.
Figure 3:
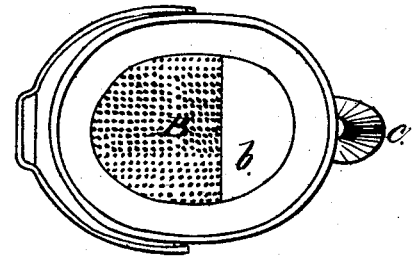
Figure 3 is a top view showing the inside view.

A, fig. 1, represents the pail, which is deeper than the ordinary bucket, and instead of being round, the sides are flattened, thus giving it an elongated form, as represented by fig. 3. This pail is constructed with two bottoms, an inner one, B, and an outer one, forming a chamber, C, at the bottom of the pail, a part of this inner bottom being perforated for purposes hereafter shown. D is a tube extending down the side of the pail and connecting with the chamber at $a$, fig. 2; this tube has a funnel-shaped mouth, $c$, as represented in the drawings. The water of the required temperature for the bath is put into the pail and the feet of the patient introduced therein, it being desirable to have the water of the same temperature when the feet leave the bath as when they enter it in the ordinary way. This is accomplished by removing the feet while the hot water is poured in, thus exposing them to the cold, or by pouring it in while the feet are in the water, which is liable to scald them; but by means of the tube all this inconvenience is avoided. The feet of the patient rest upon the guard, $b$, or that part of the inner bottom which is not perforated, and as the temperature of the water decreases the hot water is poured into the mouth of the tube D, whence it descends to the chamber C; the tendency of the heated water being to rise, it mingles freely with the cooler water, making it of an equal temperature throughout. This guard, $b$, prevents the hot water from striking the feet until it has mingled with the cooler water; thus the bath is kept of an equal temperature without trouble or inconvenience to the patient.

What I claim as my invention, and desire to secure by Letters Patent, is—

Tube D, funnel $c$, in combination with the perforated bottom B, guard $b$, and pail A, arranged in the manner and for the purpose set forth.

ISAAC A. ISAACS.

Witnesses:
W. H. BURRIDGE,
E. E. WAITE.